Patented Oct. 30, 1945

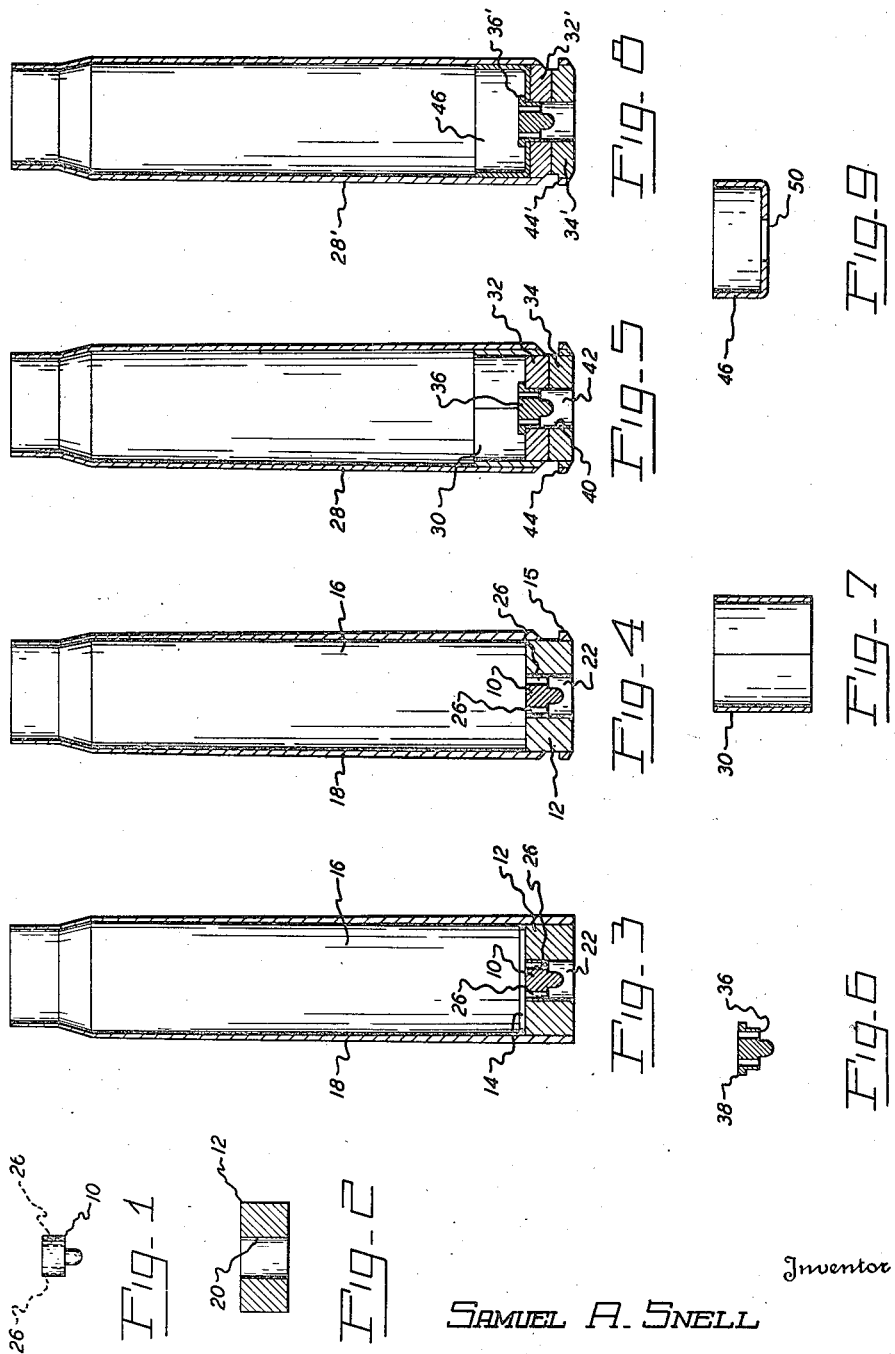

2,388,094

UNITED STATES PATENT OFFICE 2,388,094

CARTRIDGE CASE

Samuel A. Snell, Jackson, Mich., assignor, by mesne assignments, to Ryerson & Haynes, Inc., Jackson, Mich., a corporation of Michigan Application December 5, 1941, Serial No. 421,715

1 Claim. (Cl. 102—44)

The present invention relates to cartridge cases and method of making the same. In my copending application Serial No. 412,251, filed September 25, 1941, I have disclosed a cartridge case made from tube stock with a head portion defining the percussion cap chamber in the form of a screw machine product. I now propose to fabricate the head part of the cartridge in an entirely different manner, making it possible to utilize inexpensive stampings and cold forged parts.

Thus, one of the objects of the invention is to provide a cartridge case having a head portion of multiple parts welded into an integral construction.

Another object is to provide a cartridge case having a head portion fabricated from multiple parts, some of which are in the form of metal stampings.

Another object is to provide a cartridge case having a multipart head construction welded into one end of the tubular section, with a portion of the tubular section integrally associated with the head portion and constituting the ejector flange.

Another object of the invention resides in the improved cartridge case and method of making the same involving the fabrication of cartridge cases from tubular stock, welding a head portion into one end of the tubular part, and fabricating the ejector flange from the end portion of the tubular portion.

Another object is to provide an improved cartridge case having the body portion fabricated from tubular stock and having a multipart head portion including a reinforcing bushing.

These and other objects and advantages residing in the construction, arrangement, and combination of parts will become apparent from a consideration of the following specification and attached claim.

In the drawing,

Fig. 1 is a side elevational view of the anvil part,

Fig. 2 is a cross-sectional view of the main head part,

Fig. 3 is a cross-sectional view of a cartridge case, the anvil and main head part being shown in assembled position within the tubular section, Fig. 4 shows the assembly of Fig. 3 after welding and machining the ejector flange, Fig. 5 is a view similar to Fig. 4 of a modified form of the invention, Fig. 6 is a cross-sectional view of the anvil shown in Fig. 5, Fig. 7 is a cross-sectional view of the bushing shown in Fig. 5, Fig. 8 is a view similar to Fig. 5 of a further modified form of the invention, and Fig. 9 is a cross-sectional view of the bushing shown in Fig. 8.

The features of the present invention are particularly adaptable to the fabrication of cartridge cases from steel, although it is not my desire to be limited to any particular material. In practice, the main tubular section of the cartridge will be fabricated from a tube. The parts constituting the head of the cartridge may be assembled into the tubular section at any convenient point in the shaping of the latter. In my above identified application, I have shown the head part assembled into the tubular section prior to the final shaping thereof. In the above disclosure, the head parts are shown assembled after the tubular section of the cartridge has been given its final shape.

The elements of the head assembly in my improved cartridge comprise the anvil part 10 of Fig. 1, the main head part 12 of Fig. 2 and the ejector flange 15 of Fig. 4. The tubular section 16 of the cartridge is shown of tapered wall construction 18, the wall 18 tapering from a point adjacent the head end.

In Fig. 3 the anvil 10 is shown assembled in the bore 20 of the part 12 defining the percussion cap chamber 22. Preferably the anvil 10 is cold forged from wire stock in a manner similar to the way that solid rivets are made. The part 12 may be inexpensively fabricated from sheet metal on punch and coining presses. A copper wire ring 14 is shown in place prior to placing the assembly in Fig. 3 in a furnace for welding the assembled parts into an integral structure in an inert atmosphere, the process known in the art as hydrogen welding being one suitable manner of welding the parts into an integral structure. Fig. 4 shows the completed cartridge after welding and the machining operation upon the lower end of the tubular section defining the ejector flange 15. The flash holes 26 in the anvil 10 may be formed prior or subsequent to the assembly of the head parts.

In the modification shown in Fig. 5, the wall 28 of the tubular section of the cartridge is shown as being of relatively uniform thickness throughout its entire length. To reinforce the cartridge casing at the head end, the sheet metal bushing 30 of Fig. 7 is assembled in the lower end of the tubular section. As shown in Fig. 5, the main portion of the head part in lieu of being formed from a single stamping 12, as shown in Fig. 3, a pair of similar stampings 32 and 34 are employed as it facilitates the fabrication of the main body portion of the head because of the use of thinner stock. The anvil 36 is shown with a flange 38 to facilitate the correct assembling of the anvil in the bore 40 of the parts 32 and 34, which with the anvil 36 in position define the percussion cap chamber 42. The reinforcing function of the bushing 30 permits the tubular section 28 to be of uniform wall structure. After welding the assembled parts within the tubular section 28, the ejector flange 44 is obtained by machining both the tubular section and the bushing 30.

Referring to Figs. 8 and 9, in lieu of the seamed tubular bushing 30 of Fig. 5, a reinforcing bushing 46 in the form of a cupped sheet metal part is provided having an opening 50 in which an annular part 36' is assembled. The main body portion of the head is shown fabricated from similar sheet metal parts 32' and 34' and has in the case the modifications shown in Fig. 5. The ejector flange 44' is shown machined from the lower end of tubular section 28' and sheet metal parts 32' and 34'.

Having thus described my invention, what I desire to secure by Letters Patent and claim is:

As an article of manufacture, an unfinished cartridge case comprising a three part assembly consisting of a main tubular body, a flat sheet metal disk constituting the cartridge head and assembled in one end of said tubular body, with a substantial portion thereof projecting beyond said tubular body, said sheet metal disk approximating the inner diameter of the end of said tubular body in which it is secured and being of uniform cylindrical shape throughout, and an ejector flange in the form of a ring embracing the outer end of said sheet metal disk in spaced relation to the end of said tubular body in which said sheet metal disk is secured.

SAMUEL A. SNELL.